Jan. 8, 1924. 1,480,519
S. C. ECKLUND
PROCESS OF MAKING MOSAIC, MITER SQUARE WORK
Filed Aug. 30, 1921
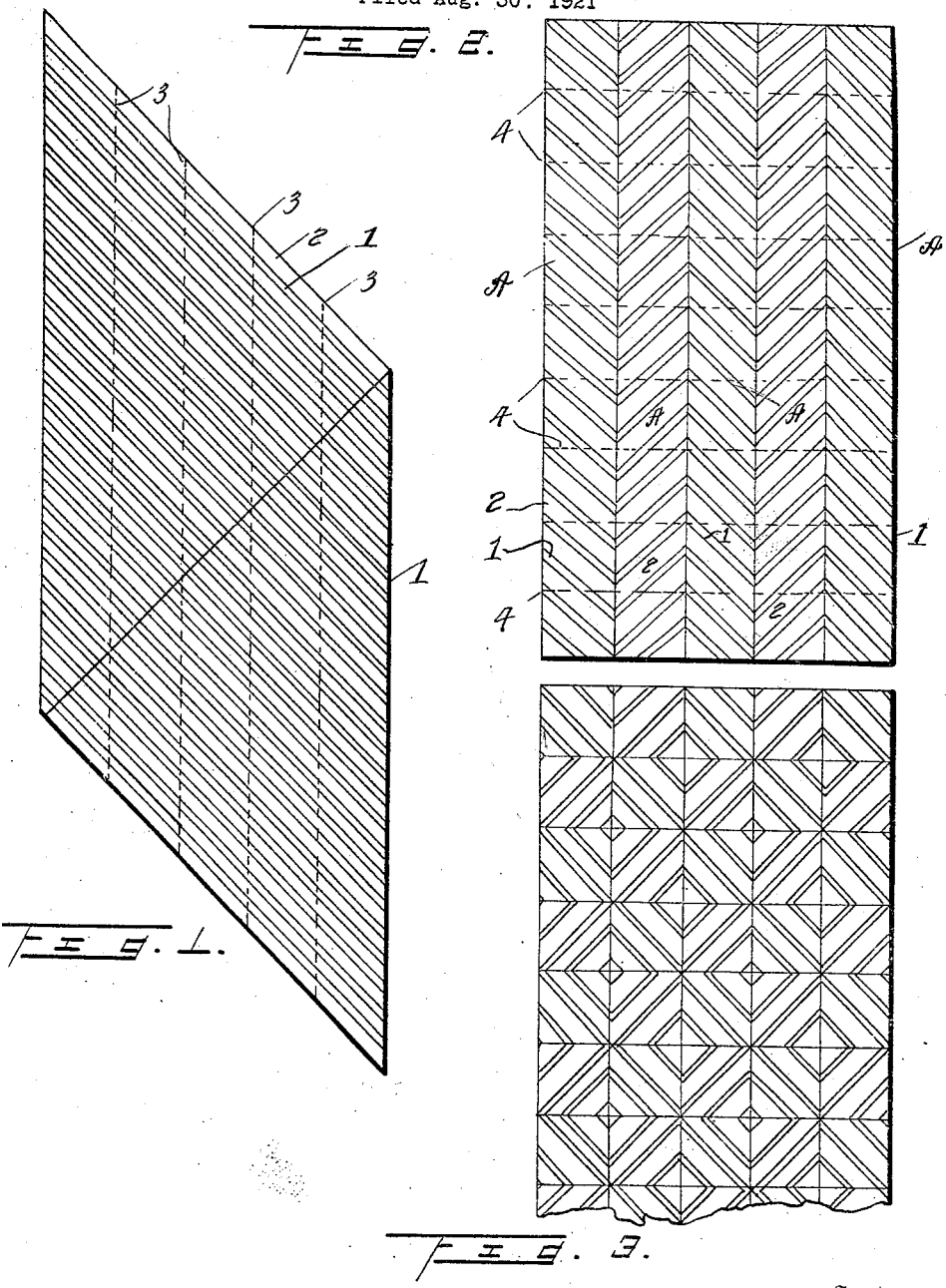
Inventor
S. C. Ecklund.
Attorney Patented Jan. 8, 1924.

1,480,519

UNITED STATES PATENT OFFICE.

SWAN C. ECKLUND, OF HERSHEY, NEBRASKA.

PROCESS OF MAKING MOSAIC, MITER-SQUARE WORK.

Application filed August 30, 1921. Serial No. 496,935.

*To all whom it may concern:*

Be it known that I, SWAN C. ECKLUND, a citizen of the United States, residing at Hershey, in the county of Lincoln and State of Nebraska, have invented certain new and useful Improvements in a Process of Making Mosaic, Miter-Square Work; and I do hereby declare the following to be a full, clear, and exact description of the invention, such as will enable others skilled in the art to which it appertains to make and use the same.

This invention relates to a decorative facing in mosaic for furniture, floors, walls and the like.

In accordance with the invention, strips of contrasting color, such as black walnut and oak, are placed side by side at an angle of 45° and secured by a suitable adhesive, such as glue. The primary composite sheet thus formed is cut up into strips of uniform width; the pieces comprising each composite strip being disposed at an angle of 45° to the length of the composite strip. The composite strips are alternately arranged with like pieces of adjacent strips matching and disposed at an angle of 90°, and are glued or otherwise adhesively secured. This secondary sheet presents zig zag lines and is cut up into strips of uniform width corresponding to the width of the strips resulting from the cutting up of the primary sheet, the cuts being in the general direction of the zig zag lines. The secondary set of strips are alternately arranged and glued with like cross pieces of adjacent strips matching, thereby producing a tessellated surface the elements of which are connected by miter joints.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawing forming a part of the specification,

Figure 1 is a detail view of the primary composite sheet formed by strips of contrasting color arranged side by side at an angle of 45° and glued.

Figure 2 is a view similar to Figure 1 of the secondary composite sheet formed by uniting strips of the primary composite sheet, and Figure 3 is a similar view of the tertiary composite sheet or product presenting a tessellated surface in which the squares having the elements connected by miter joints.

Corresponding and like parts are referred to in the following description and designated in the several views of the drawing by like reference characters.

In accordance with the present invention strips 1 and 2 of contrasting color are alternately arranged side by side and secured in any preferred way preferably by means of an adhesive such as glue. These strips are disposed relatively at an angle of 45° and the resultant sheet is cut up into strips or bars of uniform width having the cross pieces disposed relatively at an angle of 45° to the length of the strips or bars. The cuts are represented by the dotted lines 3 which are disposed in parallel relation and at an angle of 45° to the strips 1 and 2.

The strips or bars resulting from the cutting up of the primary sheet are designated by the letter A. In the formation of the secondary sheet illustrated in Figure 2 the composite strips or bars A are alternately arranged in reverse position whereby the cross pieces 1 and 2 of adjacent composite strips or bars match and occupy a relative position at 90° to one another. The secondary composite sheet resulting from uniting the strips A is cut up into strips of the same width as the strips A, the lines of severance being designated at 4, Fig. 2, which extends in the same general direction as the zig zag lines formed by the matching cross pieces of the several composite strips or bars A.

The strips or bars resulting from the cutting up of the second sheet presents squares, the strips of which formed by the cross pieces have a diagonal arrangement, the strips of adjacent squares being disposed at an angle of 90°. The secondary composite strips or bars are reversely arranged in alternation as indicated in Figure 3 and are united in any way as by means of glue. The tertiary sheet or finished product represented in Figure 3 presents a tessellated surface, the squares of which have the elements or cross pieces united by means of miter joints. The finished product may be of any thickness and may be used in the manufacture of furniture or for floors, walls, panels and decorative work of any nature desired to be finished in mosaic.

Having thus described the invention, what I claim is:

A process of preparing mosaic in miter squares which consists in arranging primary strips of contrasting color, side by side at an angle of 45° relative to the width of the respective strips and uniting the same by an adhesive, then separating the composite sheet into bars of uniform width very materially in excess of the width of said primary strips, said bars having the primary strips arranged at an angle of 45° to the length of the respective bars, then arranging the composite bars in reverse order with like primary strips matching and forming lines or strips of zig zag form, with the primary strips of adjacent bars disposed at an angle of 90°, then cutting the second sheet into bars of a width equal to the width of the first named bars, the cuts being along lines at right angles to the lines of the first cuts, then arranging the last named set of bars in reverse order and uniting the same by an adhesive, the resultant product presenting a tessellated surface having major and minor squares, the minor squares being within the major squares and the squares having the elements united by miter joints.

In testimony whereof I affix my signature in presence of two witnesses.

SWAN C. ECKLUND.

Witnesses:
BELLE LEYPALDT,
J. SHARPLEY THOMPSON.